United States Patent [19]

Mekosh, Jr. et al.

[11] 4,229,051
[45] Oct. 21, 1980

[54] ANTI-LOCKING SYSTEM

[75] Inventors: George Mekosh, Jr., Warrington; David O. Hulse, Lionville, both of Pa.

[73] Assignee: The Budd Company, Troy, Mich.

[21] Appl. No.: 939,179

[22] Filed: Sep. 5, 1978

[51] Int. Cl.² .................................................. B60T 8/093
[52] U.S. Cl. .................................. 303/99; 188/181 A
[58] Field of Search .................. 303/99, 116, 118, 7, 303/9; 188/181 A

[56] References Cited

U.S. PATENT DOCUMENTS

| 3,401,987 | 9/1968 | Horvath | 303/115 |
| 3,707,312 | 12/1972 | Drutchas | 303/116 |
| 3,907,379 | 9/1975 | Lawson | 303/118 |
| 4,025,127 | 5/1977 | Rembold | 303/118 |

FOREIGN PATENT DOCUMENTS 2500555  7/1975  Fed. Rep. of Germany ........... 303/118

*Primary Examiner*—Trygve M. Blix
*Assistant Examiner*—Reinhard J. Eisenzopf
*Attorney, Agent, or Firm*—A. L. Trueax, Jr.

[57] ABSTRACT

An anti-lock system comprises a source of pneumatic service pressure for controlling the application of pneumatic braking pressure to a wheel vehicle. A valve connected to and responsive to the speed of the wheel to shut off the service pressure when the vehicle wheel becomes locked thereby preventing braking pressure from being applied.

10 Claims, 5 Drawing Figures

ANTI-LOCKING SYSTEM

Brake control devices for preventing locking or sliding of vehicle wheels when the brakes are applied by an operator are well known. Such devices have included means for automatically controlling the release and reapplication of the wheel brake. Such "anti-lock" devices have been used in automotive vehicles such as trucks, truck trailers and buses, as well as in railway cars.

Brake control anti-lock devices have included, for example, rotary inertia type devices sensitive to acceleration and deceleration of a vehicle wheel, which may be installed within the hubs of existing truck-trailer wheels. One such device is described in a patent to Doolittle U.S. Pat. No. 2,772,904. This patent discloses spring biased valve mechanisms in the hubs of wheels and which include inertia wheels to open the valves upon sudden deceleration. Another anti-slide device for vehicle wheels is disclosed in a patent to Mortimer U.S. Pat. No. 2,964,048. A patent relating to anti-lock systems for railway wheels are disclosed in a patent to Eksergian U.S. Pat. No. 2,365,180.

Among the problems involved in many previous prior art systems is that they involve electrical devices which are difficult to check and which must operate in an environment which is very hostile in terms of maintenance of electrical integrity. Also, when mechanical valves were used to respond to lock up conditions in a wheel to bring about unlocking of the system, large amount of pneumatic pressures has to be relieved before unlocking could occur. Many such prior art systems not involving electrical devices have been relatively slow in reacting to wheel lock up.

It is an object of this invention to provide an improved anti-lock system for a vehicle wheel which involves all mechanical parts.

It is a further object of this invention to provide an improved mechanical anti-lock system which is relatively fast in response and which does not require the release of excessive pressure during locking and unlocking of the vehicle wheel.

It is a further object of this invention to provide an improved mechanical anti-lock system in which the valve components associated therewith are not exposed to adverse conditions such as extreme differences in weather or to dirt.

In accordance with the present invention, a source of braking pressure is responsive to the application of service pressure to apply pressure to the brake of a vehicle wheel. A variable control means is connected between the source of braking pressure and the brake of the vehicle wheel to control the rate of flow of pressure therethrough. A valve, adapted to be open or closed, is connected between the source of service pressure and the variable control means. A mechanical onoff valve is connected to respond to the speed of the vehicle which controls the operation of the valve connected between the source of service pressure and the variable control means. The mechanical valve opens when the deceleration of the vehicle wheel exceeds a predetermined limit to close the valve leading from the service pressure to the variable control valve thereby preventing the braking pressure from being applied. The valve may be located within the axle of the vehicle so that it is not exposed to extreme weather conditions or to dirt.

Other objects and advantages of the present invention will be apparent and suggest themselves to those skilled in the art, from a reading of the following specification and claims, taken in conjunction with the accompanying drawings, in which:

The components found in conventional systems will be described briefly for a better understanding of the invention.

As is well known, there are primary and emergency pressure tank systems included in most trailers. The emergency tank system is charged by air pressure from the tractor's sytem through an emergency supply line. When the air pressure from the tractor reaches a valve, generally referred to as a ratio relay valve, it charges the emergency tank, various hoses and the emergency side of the mechanical spring brakes. It also charges the primary tank.

When the pressure in the emergency tank reaches a predetermined level, such as 60 psi, the spring brakes begin to react and a shuttle valve in the ratio relay valve permits the air pressure to charge a primary tank. Generally, the spring brakes are completely released at a higher pressure, for example 90 psi.

Application of the parking brake of loss in the emergency line pressure wil generally cause the pressure of the ratio relay valve to be relieved, and the air pressure is exhausted from the emergency brake hoses and spring brakes. When the pressure falls below 60 psi the mechanical spring brakes are automatically applied.

When the spring brakes are released and service brakes are applied by an operator in the tractor, air pressure will flow from a source within the tractor through the service line into the service system of the trailer.

The service pressure is applied to a relay valve which permits the air pressure in the primary tank to be applied to the service brakes.

Release of the service brakes causes the air pressure in the service line to be exhausted causing the relay valve to release the delivery air pressure from the service sides of the brake chambers to release the service brakes.

Figure 1:
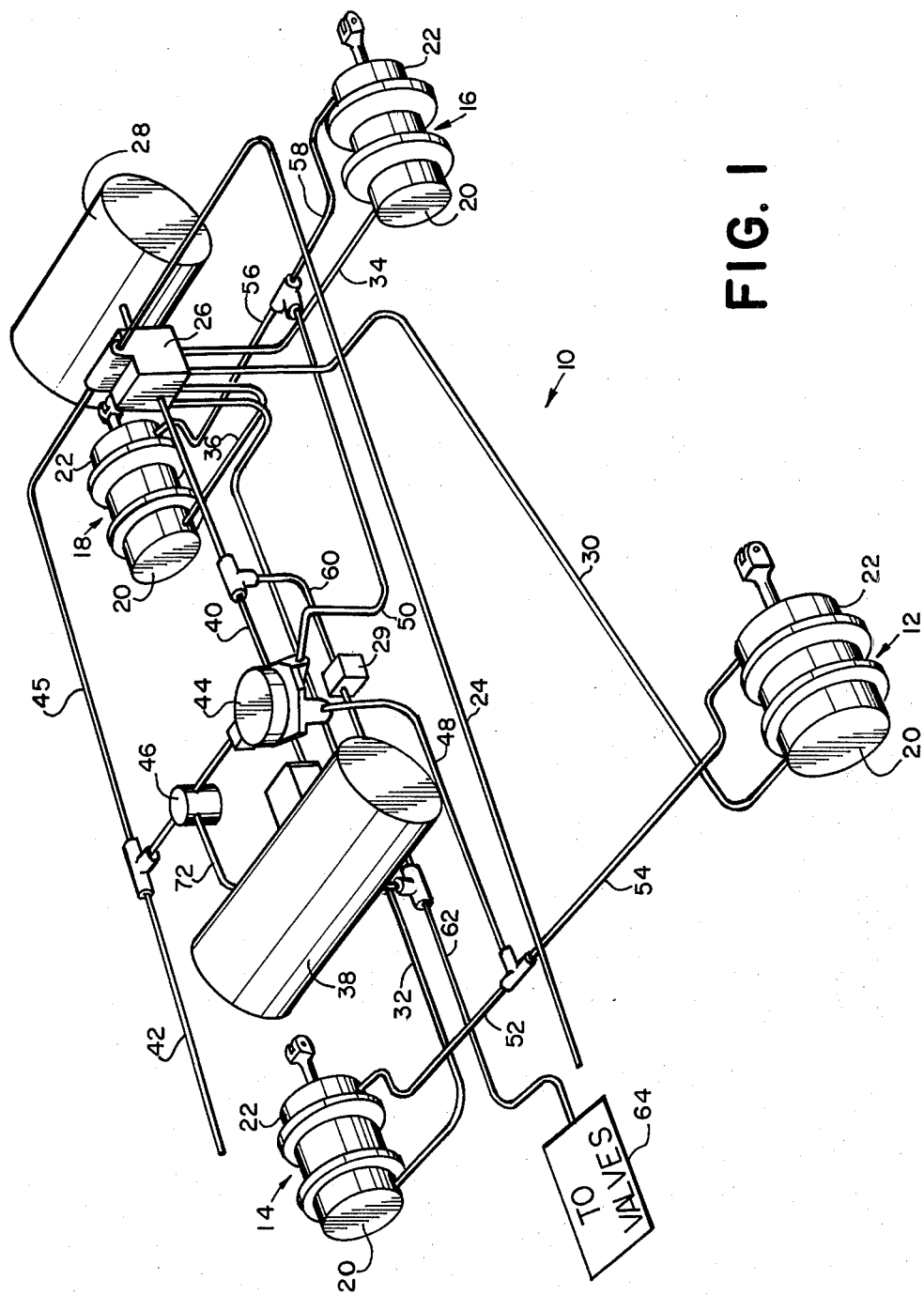
FIG. 1 is a schematic representative of a braking system for a trailer, embodying the present invention.

Referring particularly to FIG. 1, a brake system 10 of a two axle trailer includes a pair of front brake assemblies 12 and 14 and a pair of rear brake assemblies 16 and 18. All the brake assemblies illustrated may be of the conventional type. For example, each of the assemblies include a parking brake chamber 20 and a service brake chamber 22.

The main air pressure from the tractor is applied to an emergency or supply line 24. As air pressure reaches a ratio relay valve 26, it is directed to charge an emergency tank 28 and to hoses 30, 32, 34 and 36 which are connected to the parking brake chambers 20 of the brake assemblies 12, 14, 16 and 18, respectively. With no pressure in the parking brake line or hoses 30, 32, 34 and 36, the brakes are mechanically applied and the trailer cannot be moved.

When the pressure in the emergency tank 28 and hoses 30, 32, 34 and 36 reach a predetermined pressure, for example 60 psi, the parking brake springs (not illustrated) in the parking brake chambers 20 begin to release the brakes. As the pressure reaches 60 psi, a shuttle valve in the ratio relay valve 26 allows air pressure to charge a primary tank 38 through a line 40. The pressure in the tank 28 continues to raise to about 90 psi, for example. When the pressure in the primary tank 38 reaches 90 psi, the spring brakes are fully taken off and the trailer may be moved. As previously mentioned, application of the parking brake or loss in the supply line pressure will cause the pressure from the relay valve 26 to be relieved to thereby exhaust the air pressure from the parking brake chambers and thus mechanically reapply the spring brakes.

With the spring brakes released, application of the service brake, resulting from an operation inside the tractor will cause air pressure to be applied into the system from the tractor to the trailer through a service line 42. The service line 42 is normally at zero pressure until the service brakes are applied.

When the service brakes are applied, the relatively large volume of the primary tank 38 is applied to the service chambers 22 of the brake assemblies 12, 14, 16 and 18 through a relay valve 44. The service pressure is applied to the relay valve 44 through slave valve 46. The slave valve 46 is held open during normal operation by pressure and closes under a lock-up condition of the wheels of the vehicle, as will be subsequently described in greater detail. One side of the ratio relay valve 26 leading to a line 45 serves as an anti-compounder. This is not related to the invention, but anti-compounding generally prevents service pressure from adding to the supply pressure and prevents possible rupture of other components involved.

Pressure from a pilot line, to be described, normally maintains the slave valve 46 open. Greater service pressure which is applied by the operator to the brake pedal, for example, willl cause more pressure to pass from the primary tank 38 through the relay valve 44 to the service brakes 22 through lines 48, 50, 52, 54, 56 and 58. Basically, the relay valve 44 may include a diaphragm disposed to receive pressure from the service line 42. Greater pressure on this diaphragm permits greater pressure to flow through the valve 44 from the primary tank 38 to the service brake chambers 22. When the driver or operator removes his foot from the pedal or other service pressure control mechanism, the pressure in the service line 42 drops and the pressure against the diaphragm in the relay valve 44 is released to prevent pressure from passing from the primary tank 38 to the service brake chambers 22.

The anti-lock mechanism involving the present invention includes means for closing the normally open slave valve 46 to prevent pressure in the service line 42 from reaching the relay valve 44. With no service pressure applied to the relay valve 44, the pressure from the primary tank 38 to the service brake chambers 22 will be blocked. As a result, no pressure will be applied through the lines 48, 50, 52, 54, 56 and 58 to the service brake chambers 22 of the brake assemblies 12, 14, 16, and 18.

The slave valve 46 is normally held open by what will be referred to hereinafter as pilot pressure. This is the pressure in lines 60, 62, and 72 connected to anti-lock devices generally indicated by a block 64, to be described in connection with subsequent figures. The antilock devices or valves are connected to rotate with the wheels of a trailer, for example. Pressure to the lines 60, 62 and 72 is supplied through the valve 26 and control valve 29 from the emergency tank 28. The conduit 72 is connected to the slave valve 46 to provide pressure and to maintain it open.

The inertia valves, to be described hereinafter in detail, are connected to the slave valve 46 through the conduits 62 and 72, and are normally closed during normal braking operation. However, during "lock-up" one or more of inertia valves open and the pressure which keeps the slave valve open is relieved causing the slave valve 46 to close and prevent the service from being applied from the service line 42 to the relay valve 44. Under these circumstances, braking pressure as applied from the primary tank 38 to the service brake chambers 22 is caused to drop off and escape through the appropriate exhaust ports in the relay valve 44 (not illustrated). After unlocking of the wheels occur, the inertia valves or sensors (in block 64) closes and normal braking operations may be resumed.

The inertia valves or sensors may be considered as valves which, when closed, maintain the pilot pressure in lines 60, 62 and 72 and allows the slave valve 46 to assume its normally open position. When the inertia sensors or valves open, the pilot pressure drops and the slave valve 46 closes. Closing of the slave valve 46 also permits any service pressure accumulated in the relay valve 44 to exhaust by ports not illustrated. When the wheel of the vehicle comes back up to speed, the inertia sensors or valves close permitting the pilot lines to repressurize. When the pilot lines are repressurized to about 40 psi, for example, the slave valve 46 opens to allow service pressure to resume flowing into the relay valve 44 thus permitting a reapplication of pressure from primary tank 38 to the service brake chambers 22.

Figure 2:
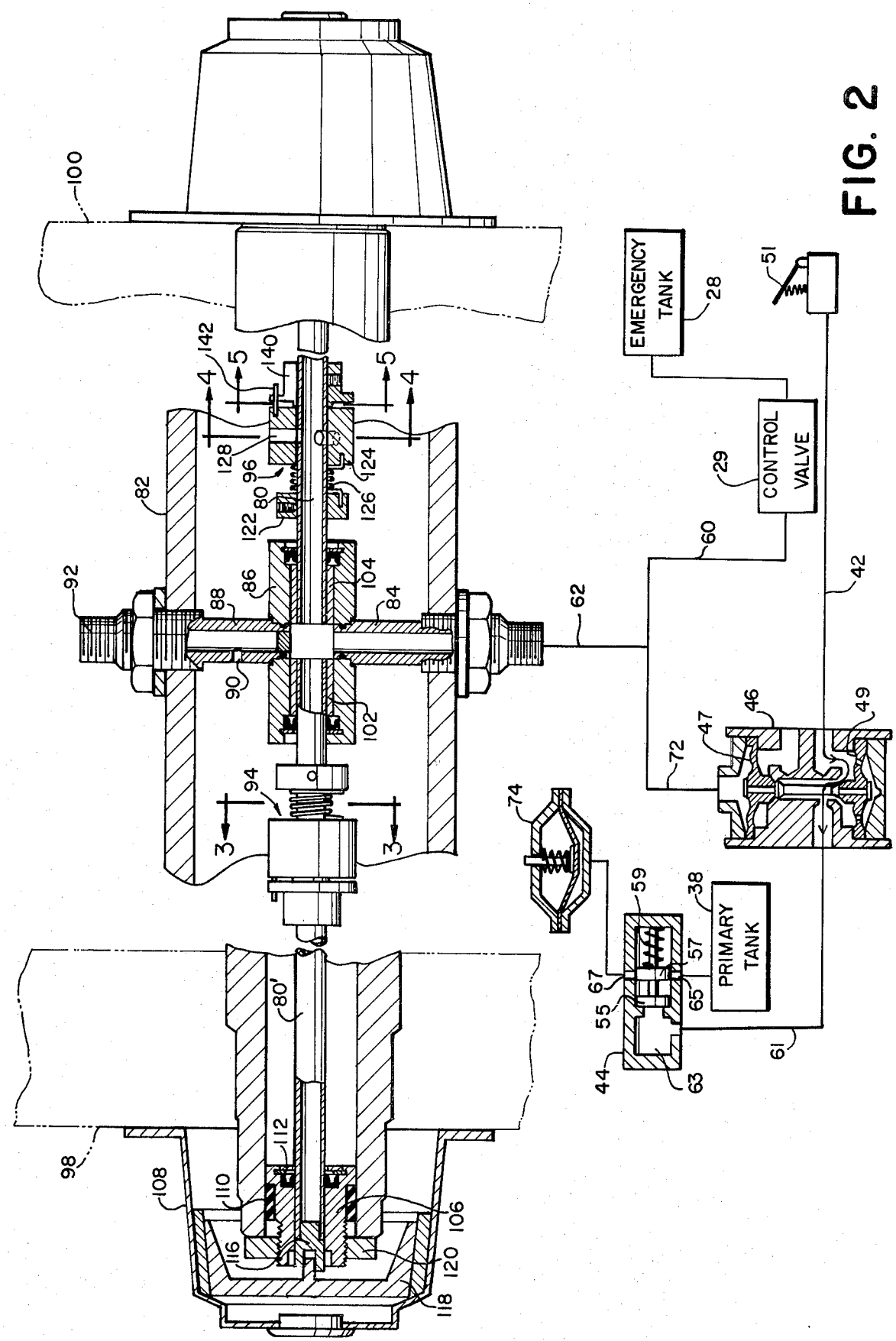
FIG. 2 is a portion of the system illustrated in FIG. 1, partly in block diagram form along with a mechanical anti-lock system, in accordance with the present invention.

Referring to FIG. 2, some of the main components of the anti-lock system of FIG. 1 are illustrated along with the inertia valves contained within the block 64 previously mentioned. Pressure from the emergency tank 28 is applied through the pressure limiting control valve 29 to the slave valve 46 to force diaphragms 47 and 49 to the down open positions. Service pressure resulting from operation of a pedal 51 in the tractor passes from the line 42 through the slave valve 46 to the relay valve 44.

A simplified version of the valve 44 includes a pair of pistons 55 and 57 biased by a spring 59. Pressure from a line 61 passes through an opening in the valve 44 into the chamber 63. This pressure opposes the force of the spring 59 to cause the piston 57 to move and unblock openings 65 and 67. The distance moved by the piston 57 is proportional to the service pressure of the line 61. Braking pressure is applied to a brake 74 from the primary tank 38 through the openings 65 and 67 of the valve 44.

As previously mentioned, pressure from the emergency tank 28 passes through a valve 29 which controls the amount of pilot line pressure and fills the pilot line comprising lines 60, 62, and 72. The pressure in the line 72 keeps the valve 46 open. When one of the valves, to be described, opens as during lock-up of their associated wheels, the pressure in the pilot line drops and the valve 46 closes.

FIGS. 2, 3, 4 and 5 illustrate a valve arrangement which may be connected to the line 62. Pressure from the line 62 is passed to inner tubes 80 and 80' which are supported in the center of the axle of the vehicle 82 within a center support assembly 86. The pressure from the line 62 passes through a support conduit 84 leading into and supporting the center support assembly 86. A top support conduit 88 is connected to the center support assembly 86 and is connected to atmosphere through an opening 92. An aperture 90 in the top conduit 88 leads to the interior of the axle 82. The pressure within the axle 82 is therefore vented to the atmosphere through openings 90 and 92.

The interior of the hollow tubes 80 and 80' are normally maintained at the same pressure as the pressure in the line 62 when the associated valves, to be described, are closed, this pressure being referred to hereinafter as the pilot pressure. A pair of valve assemblies 94 and 96, as will be described in connection with FIG. 4, include openings therein disposed to be aligned or misaligned with apertures in the tubes 80 and 80' to open or close valves as will be described in greater detail. The closed valves associated with assemblies 94 and 96 maintain the pressure within the tubes 80 and 80' at the same pressure in the line 62 or at pilot pressure.

The assembly 96 includes a collar 122 rigidly fixed to the tube 80 and a second collar 140 also fixed to tube 80. An inertia sleeve 124 is disposed between the two collars. A bias spring 126 is disposed between the fixed collar 122 and the inertia sleeve 124. A stop pin 142 is fixed to the inertia sleeve 124 and disposed to contact stops on the collar 140 as will be described.

The tubes 80 and 80' are rotated in the center support 86 and connected to a pair of wheel assemblies 98 and 100 to rotate therewith. During normal rotation, not involving a lock up condition, all of the elements associated with the valve assemblies 94 and 96 rotate with the tubes 80 and 80'. In describing the various mechanical arrangements, it is understood that the mechanical arrangement associated with the wheel 98 is the same as the mechanical arrangement associated with the wheel 100. Consequently, only the mechanism associated with the wheel 98 will be described in detail. Also, it will be understood that the valve mechanisms 94 and 96 are similar and both operate in the same manner. Consequently, only the valve mechanism 96 will be described in detail.

The hollow tubes 80 and 80', which rotate in the center support 86, extend in opposite directions from the center support 86 and are connected to be moved with the wheels 98 and 100. The end of the tube 80' away from the center support 84 is connected to a plug 106 which is connected to various other elements which are moved with a hub 108 secured to the wheel 98. A bushing 110 holds the plug 106 within the end of the axle opening. A seal 112 and washer 114 are provided at the inner end of the plug 106. An end plug 116 is fitted into the end opening of the tube 80' and adapted to receive a hub cap insert 118. A nut 120 is provided on the end of the plug 116. The pressure within the tubes 80 and 80' is maintained by the tight fittings of the various parts.

During operation, the wheel 98, hub 108, tube 80' and the associated parts at the end of the axle 82 are all connected to be rotated in unison independent of the stationary axle 82. In addition, the valve assemblies 94 and 96 are connected to be moved by the tubes 80 and 80', which also rotate on suitable bearings within the center support member 86. During normal acceleration or speed of the wheels 98 and 100, the relative positions of the elements associated with the assemblies 94 and 96 with respect to the tubes 80 and 80' will remain unchanged and the valves associated therewith will remain closed. Consequently, the pressure within the tubes 80 and 80' will be at the same pilot pressure as that being provided at the line 62. As previously mentioned, this pilot pressure maintains the diaphragm 49 of the valve 46 in an open or down position. This condition allows service pressure to be applied to the brake 74.

The assemblies 94 and 96 are spring-operated devices disposed to rotate slightly on the periphery of the tubs 80 and 80' during high deceleration of one or both of the wheels 98 and 100. In general, the inertia sleeves associated with assemblies 94 and 96 each include an opening disposed to align with openings in the tubes 80 and 80' during excessive deceleration conditions. When an aperture in one of the valve assemblies 94 or 96 becomes aligned with an aperture in one of the tubes 80 and 80', pressure passes into the interior of the axle 82 and is vented to atmosphere, in a manner to be described.

The valve assemblies 94 and 96 are the same in operation. The valve assembly 96 includes the collar 122 fixedly mounted by suitable means to the tube 80. The inertia wheel or sleeve 124 is rotatable about a small angle on the tube 80, but is normally spring biased to move with the tube 80. The inertia member 124 is rotatably mounted on the tube 80 so that in the event of sudden deceleration, it overcomes a spring bias and continues to move with respect to the tube 80 and the collar 122 fixed thereto. During the relative movement of the sleeve 124 with respect to the collar 122, apertures in the inertia sleeve 124 and the tube 80 become aligned to permit pressure to pass from the interior of the tube 80 to the interior of the axle 82.

A bias spring 126 is disposed around the tube 80 between the collar 122 and the inertia wheel 124. One end of the spring extends into the collar 122 with the opposite end extending into the inertia sleeve 124. The spring 126 is biased to normally cause the inertia wheel 124 to be moved with the tube 80.

Figure 3:
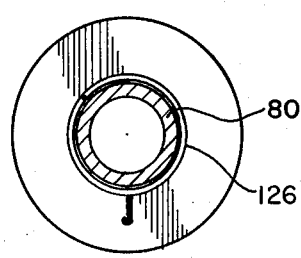
FIG. 3 is a view taken along lines 3—3 of FIG. 2.
Figure 4:
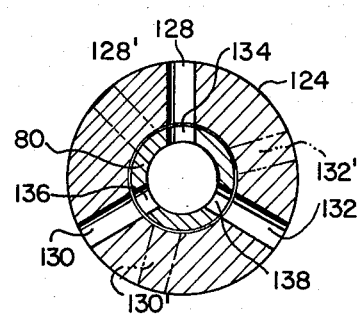
FIG. 4 is a view taken along lines 4—4 of FIG. 2.
Figure 5:
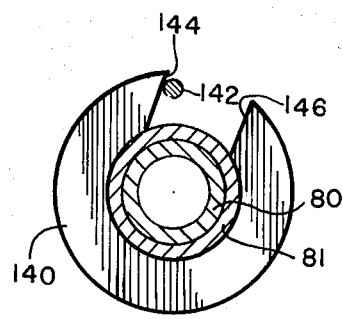
FIG. 5 is a view taken along lines 5—5 of FIG. 2.

The various apertures with the tube 80 and inertia sleeve 124 and operation of the assembly 96 is more clearly illustrated in FIGS. 3, 4 and 5. The spring 126 maintains the inertia sleeve 124 in a biased position in a counterclockwise position with respect to the tube 80 and the collar 122. The rotation of the tube 80 and associated wheel 100 may be in the opposite or clockwise direction. The bias of the spring 126 aids in keeping the apertures in the tube 80 and the apertures in the inertia sleeve 124 misaligned with respect to each other to maintain the pressure within the tubes 80. However, a pin 142 physically connected to the inertia sleeve 124 contact stops on the collar 140 which is fixed to the tube 80. These stops comprise the main force for moving the inertia sleeve 124 during normal operation as illustrated in FIG. 5.

Referring to FIG. 4, a condition is illustrated in which the valve is open. In this case, the radially extending apertures in the inertia sleeve 128, 130 and 132 are aligned with apertures 134, 136 and 138 in the tube 80. This is a condition in which the wheel 100 has decelerated at a high rate causing the inertia sleeve to overcome the bias of the spring 126 and continue to move in a clockwise direction. In this condition, the pressure within the tube 80 passes through the apertures 134, 136 and 138 from the interior of the tube 80 through apertures 128, 130 and 132 of the inertia sleeve 124 and into the interior of the axle 82. From the interior of the axle 82, the pressure is relieved through an aperture 90 (FIG.

2) into the inner opening of the support member 88 into the atmosphere through a member 92.

The dotted lines 128', 130' and 132' illustrated in FIG. 4 show the positions of the apertures of the inertia sleeve 124 when the valve is in a closed condition, the inertia sleeve 124 is driven by stops on the collar 140 fixed to the tube 80 which contact the pin 142 extending from the inertia sleeve 124. The spring 128 adds to the force to maintain the associated valve closed and provides a threshold level for operation of the valves.

The second stop collar 140 is fixedly secured to rotate with the tube 80. A pin 142 secured to the inertia sleeve 124 is disposed to move between a cut out area of the stop collar 140 which includes stop surfaces 144 and 146. One of the stop surfaces 144 contacts the stop surface 144 to normally drive the inertia sleeve 124 and maintain the associated valve shut. When the inertia sleeve 124 is moved with respect to the tube 80 and stop collar 140 fixed thereto, the pin 142 of the inertia wheel 124 moves from the surface 144 and, if the deceleration of the wheel is sufficiently high, contacts the surface 146. This causes the associated valve to open. Thus, while the inertia sleeve 124 is free to rotate about the tube 80, it is limited in its degree of relative movement. It is noted that the spring 126 provides bias to establish threshold levels at which its associated valve mechanism opens and closes.

The stop collar 140 includes an inner circular extension 81 to provide space between the inertia sleeve 124 and the main area of the stop collar 140.

When the valves associated with the assemblies 94 and 96 are closed, i.e., the apertures in the tubes 80 and 80' are misaligned with the apertures in the inertia sleeve 124, the pilot pressure is maintained in the lines 60, 62 and 72 to permit normal service pressure to be applied to the brake 74. Under a lock-up condition or during high deceleration of the vehicle wheel, one of the valves associated with the assemblies 94 and 96 open, i.e., the tube and sleeve apertures become aligned, to relieve the pilot pressure in the lines 60, 62 and 72. This causes the valve 46 to close and service pressure cannot be applied. Braking of the wheel is therefore discontinued and the wheel starts to speed up. When the wheel has speeded up sufficiently the stop on the stop collar 140 contacts the pin 142 on the inertia sleeve and restores the inertia sleeve 124 to its original position to close the associated valve. The pilot pressure is built up and the normal braking operation may be resumed.

The valves will generally open and close in a series of sequences during a lock-up condition or during excessive deceleration of the vehicle wheel.

The present invention provides a relatively quick means for discontinuing the application of breaking pressure upon high or excessive deceleration. This is accomplished without the necessity of bleeding the pressure through relatively small valves. A small drop in pilot pressure is generally sufficient to cause the braking action to be discontinued.

The location of the various valve assemblies within the axle provides advantages. The valves are not directly exposed to external weather conditions or to dirt particles which would tend to affect their operations.

While anti-locking devices have been illustrated with two wheels connected tin parallel to the pilot lines, it is apparent that independently operating devices could be provided.

The main valves described are commercially available. For example, the Ratio Relay Valve 26 may be type 1659-8-B manufactured by B. F. Goodrich. The slave valve 46 may be type 250-A-3-10-20 manufactured by Humphrey. The valve 44 relay valve may be type 286370 manufactured by Bendix-Westinghouse.

What is claimed is:

1. In combination with a wheel on a vehicle, having a brake associated therewith,
   an anti-lock system comprising:
   (a) a source of service pressure,
   (b) a source of braking pressure for applying braking pressure to said wheel,
   (c) first control means responsive to the application of said service pressure to permit said braking pressure to be applied to said brake,
   (d) second control means responsive to pressure changes adapted to permit and prevent pressure from passing therethrough connected between said source of service pressure and said first control means, and
   (e) valve means responsive to the speed of said wheel to control the operation of said second control means by altering operating pressure supplied thereto to permit service pressure to pass therethrough during normal braking operations and to prevent service pressure from passing therethrough when the deceleration of said wheel exceeds a predetermined rate to thereby prevent braking pressure from being applied to said wheel.

2. The invention as set forth in claim 1 wherein said valve means responsive to the speed of said wheel includes a source of pilot pressure applied to said second control means to control its operation.

3. In combination with a wheel on a vehicle, having a brake associated therewith,
   an anti-lock system comprising:
   (a) a source of service pressure,
   (b) a source of braking pressure for applying braking pressure to said wheel,
   (c) first control means responsive to the application of said service pressure to permit said braking pressure to be applied to said brake,
   (d) second control means adapted to permit or prevent pressure from passing therethrough connected between said source of service pressure and said first control means, and
   (e) means responsive to the speed of said wheel to control the operation of said second control means, said responsive means includes a source of pilot pressure for supplying pilot pressure for application to said second control means to control its operation and a mechanical valve associated with said wheel and connected to said pilot pressure, said mechanical valve being normally closed during normal movement of said wheel and responsively moveable to open when deceleration of said wheel exceeds a predetermined rate, whereby service pressure is permitted to pass therethrough during normal braking operations and service pressure is not permitted to pass therethrough when deceleration of said wheel exceeds a predetermined rate to thereby prevent braking pressure from being applied to said wheel.

4. The invention as set forth in claim 3 wherein said second control means comprises a valve means and is connected to said pilot pressure and responsive thereto to open to permit said service pressure to be applied to said first control means and to close when said pilot pressure drops to prevent said service pressure from being applied to said first control means.

5. The invention as set forth in claim 3 wherein said vehicle comprises a trailer having a hollow axle and said mechanical valve is disposed within said hollow axle.

6. The invention as set forth in claim 5 wherein said vehicle comprises two wheels disposed on the ends of said axle with a mechanical valve being associated with each of said wheels, said mechanical valves being supported by support means disposed towards the center of said axle, and means are provided to connect said mechanical valves to said wheels.

7. In combination with a wheel on a trailer,
- a first source of primary pressure for applying braking pressure to a brake of a wheel of a vehicle,
- a variable control modulator valve connected between said first source of primary pressure and said brake to control the rate of flow of pressure therethrough,
- a second source of service pressure disposed to be selectively applied to said modulator valve to control the rate of primary pressure applied from said first source to said brake,
- a slave valve disposed to open or close connected between said second source of service pressure and said modulator valve,
- a third source of pilot pressure connected to normally open said slave valve to permit service pressure from said second source to be applied to said modulator valve,
- valve means associated with said third source of pilot pressure connected to respond to the acceleration or deceleration of the wheel of said vehicle,
- said valve means being normally closed and adapted to be open when the deceleration of said wheel exceeds a predetermined limit thereby relieving the pilot pressure from said third source to close said slave valve to prevent the service pressure from said second source from reaching said modulator valve to discontinue braking of said wheel.

8. The invention as set forth in claim 7 wherein said third source of pilot pressure being provided by an emergency pressure source.

9. The invention as set forth in claim 8 wherein a control valve is connected between said emergency pressure source and said slave valve for controlling pilot line pressure source.

10. The invention as set forth in claim 9 wherein a plurality of said mechanical valves are associated with a plurality of wheels and connected between said emergency pressure source and said slave valve for controlling application of pressure to said slave valve.

* * * * *